(12) United States Patent
Fryxell et al.

(10) Patent No.: US 7,955,574 B2
(45) Date of Patent: Jun. 7, 2011

(54) POROUS THIN FILM AND PROCESS FOR ANALYTE PRECONCENTRATION AND DETERMINATION

(75) Inventors: Glen E Fryxell, Kennewick, WA (US); Xiaohong Li, Richland, WA (US); Raymond S Addleman, Benton City, WA (US); Richard Skaggs, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 258 days.

(21) Appl. No.: 12/242,924

(22) Filed: Oct. 1, 2008

(65) Prior Publication Data

US 2010/0077837 A1    Apr. 1, 2010

(51) Int. Cl.
*G01N 33/00* (2006.01)
(52) U.S. Cl. .......................... 422/501; 422/401; 422/500
(58) Field of Classification Search ................. 422/101, 422/99, 56, 401, 501, 500
See application file for complete search history.

(56) References Cited

U.S. PATENT DOCUMENTS

| | | |
|---|---|---|
| 4,942,135 A | 7/1990 | Zaromb |
| 5,001,453 A | 3/1991 | Ikejiri et al. |
| 5,142,143 A | 8/1992 | Fite et al. |
| 5,481,110 A | 1/1996 | Krishnaswamy et al. |
| 6,171,378 B1 | 1/2001 | Manginell et al. |
| 6,455,003 B1 | 9/2002 | Anvia et al. |
| 6,808,742 B2 | 10/2004 | Rouse et al. |
| 6,852,299 B2 | 2/2005 | Kohmura et al. |
| 6,946,161 B2 | 9/2005 | Yamada et al. |
| 7,016,462 B1 | 3/2006 | Keville et al. |
| 7,147,695 B2 | 12/2006 | Mitra |

FOREIGN PATENT DOCUMENTS

| | | |
|---|---|---|
| JP | 2002137913 A | 5/2002 |
| WO | 2006026067 A1 | 3/2006 |
| WO | 2007127921 A2 | 11/2007 |

OTHER PUBLICATIONS

Katsoulidis, et al, Ordered mesoporous CoOx/MCM-41 materials exhibiting long-range self-organized nanostructured morphology, Elsevier, Jan. 1, 2006, pp. 71-80.
Lu, et al, Microporous Silica Prepared by Organic Templating: Relationship between the Molecular Template and Pore Structure, American Chemical Society, Apr. 29, 1999, pp. 1223-1229.
International Search Report/Written Opinion.
Zhao, Dongyuan, et al., Continuous Mesoporous Silica Films with Highly Ordered Large Pore Structures, Advanced Materials, Wiley-VCH Verlag, Weinheim, DE, vol. 10, No. 16, Nov. 10, 1998.
Bruinsma, P. J., et al., Low K Mesoporous Silica Films Through Template-Based Processing, Mat. Res. Symp., Materials Research Society, USA, vol. 443, Jan. 1, 1997.
Zhang, Xiaoming, et al., Synthesis of Transition-metal Containing MSU Mesoporous Silica Molecular Sieves, Chemistry Letters, Chemical Society of Japan, Tokyo, JP, No. 8, Aug. 1, 1998.

*Primary Examiner* — Sam P Siefke
(74) *Attorney, Agent, or Firm* — James D. Matheson

(57) ABSTRACT

A porous thin film and a method are disclosed. The film has a generally uniform thickness and includes fused silica particles that provide multiple types of pores in the film. Particles are generally uniformly distributed on a surface and have a generally open structure that provides the film with an open interface readily accessible to fluids. The film provides for preconcentration of, e.g., heavy metals in fluid and gas samples that provides for direct determination of the analytes.

40 Claims, 6 Drawing Sheets

POROUS THIN FILM AND PROCESS FOR ANALYTE PRECONCENTRATION AND DETERMINATION

FIELD OF THE INVENTION

The present invention relates generally to materials and methods for analyte determination. More particularly, the invention relates to a porous thin film and process for preconcentration and determination of analytes in fluids and gases.

BACKGROUND OF THE INVENTION

Preconcentration of analytes has long been recognized as a way to enhance the sensitivity of selected analytical methods. Preconcentration increases the analyte concentration, and removes other potentially interfering constituents in a matrix, thereby making an assay more effective over a broader range of conditions. One recognized technique for direct multielemental analysis of solids is X-Ray Fluorescence (XRF). However, trace analysis of analytes in liquids by XRF has proven to be largely ineffective due to very poor detection limits for the analytes. Thus, other analytical techniques have proven more attractive for this type of analysis. Although a variety of ways have been proposed in the literature for improving XRF results for fluid samples, these methods have not been commercialized primarily because they do not provide a technically effective method to obtain the degree of preconcentration necessary from liquid samples in a stable, rapid and cost effective manner. Most solid phase sorptive materials fail to provide sufficient degrees of preconcentration, are heterogeneous, and have an incompatible physical form (uniformity, porosity, thickness, etc.) to enable direct XRF analysis. While preconcentration can be effected, e.g., by bulk solvent removal, solvent extraction, selective membranes, or selective capture by ion exchange resins, each of these approaches is labor intensive, and some of these methods also require significant quantities of laboratory reagents that can generate significant amounts of chemical waste. Various research teams have suggested that highly porous ceramic thin films could be useful for enhancing sensor performance. However, mesoporous thin films known in the art, whether spin-cast or dip-cast, have failed to demonstrate successful preconcentration of, e.g., ionic species in aqueous media simply because these films have not been shown to be hydrothermally stable. When immersed in a condensed aqueous phase, for example, spin-cast and dip-cast thin films delaminate, dissolve, or densify due to the high strain fields inherent in these films. Templated sol-gel approaches for making thin films introduce tremendous interfacial strain in the thin films during the curing process which can lead to film delamination, pore structure collapse, and film dissolution, all of which are detrimental to the use of these films for sensing/detection applications. The surfactant templating process also creates pores that tend to align parallel to the plane of the film and may not be accessible to solution-borne analytes. Surfactant templated sol-gel processes also tend to result in film structures that contain a dense, non-porous "skin", or capping layer, at the film interface, which can shut down diffusion into the porous films and negates the value of the high surface area porosity underneath. Other methods for making porous silica films include gluing silica powders to surfaces using adhesives or polymer melts. While this approach is simple and direct, it offers no direct control of film thickness, and can result in irregular film structures and film thicknesses. In addition, the adhesives can diffuse into the pores, blocking valuable surface area and active surface sites, which is detrimental to utilization of the porous films for analyte preconcentration for sensing/detection. Other methods of analyte preconcentration include the use of polymer thin films that have been doped with suitable ligands (either covalently attached to the polymer backbone, or simply percolated into the polymer film). Again, this approach is simple and direct, but it suffers from a number of drawbacks. For example, diffusion of analytes into a polymer thin film is slow, so preconcentration is time consuming. These polymer thin films are prone to solvent swelling, and even delamination, creating instability in the analytical results. Polymer thin films that include swellable organic matrices are also prone to fouling by organic constituents (e.g., proteins, humic acids and the like) which complicates the environmental sampling process and introduces error into the analytical output. Accordingly, new methods are needed that permit direct integration of preconcentration schemes into sampling/analysis protocols. Such protocols could simplify: 1) sampling procedures for extraction and preconcentration of analytes in fluids, 2) execution of the assays for determination of the analytes, and 3) long-term storage of the archived sample.

SUMMARY OF THE INVENTION

The invention in one aspect is a porous thin film that preconcentrates preselected analytes for analysis. The thin film includes fused silica particles that are generally uniformly distributed on a substrate and have a generally uniform thickness with an open interface. The particles have a generally open, multi-modal pore size distribution that is retained in the film with a surface area that is greater than about 200 $m^2/g$. Greater than about 50% of the surface area of the particles in the films is chemically accessible. The film can be functionalized with various ligands that selectively bind to preselected analytes that collect and concentrate the analytes in the film when contacted by the analytes in a fluid, e.g., in the vapor-phase, or in the liquid-phase. Ligands include, but are not limited to, e.g., thiols, carboxylates, sulfonates, phosphonates, amines, phosphines, ammonium salts, phosphonium salts, and like ligands. The films have a preferred thickness in range from about 0.1 µm to about 30 µm. More preferably, the films have a thickness in the range from about 0.3 µm to about 30 µm. Yet more preferably, the films have a thickness in the range from about 0.5 µm to about 50 µm. In various other embodiments, the films have a thickness in the range from about 0.1 µm to about 1 µm; or from about 1 µm to about 10 µm; or from about 10 µm to about 100 µm. The particles in the film have an open surface area of greater than about 90 percent. In the films, particle mesopores are of a size of from about 20' to about 200'. The films also include macropores in the calcined film external to the silicate particles with sizes that range from about 50 nm to about 50 microns. In various embodiments, the film can include preselected quantities of various preselected materials including, but not limited to, e.g., ceramics, metals, oxides, metal oxides, and combinations of these materials. In one embodiment, the uniform distribution of the film on the substrate is obtained by a process of screen-printing.

The invention, in another aspect, is a preconcentrator device that includes a porous thin film having a generally uniform thickness characterized by: fused silica particles generally uniformly distributed on a substrate. The particles of the preconcentrator have a generally open, multi-modal pore size distribution and the film has an open interface.

The invention in another aspect is a method for making a porous thin film that preconcentrates analytes for analysis. The method includes the steps of: distributing a slurry comprising silica particles of at least one preselected size upon a surface to form a generally uniform layer thereon; calcining the layer to form a generally open fused, porous thin film having a multimodal pore size distribution and an open interface; and functionalizing the thin film.

In a preferred embodiment, the slurry particles are silica particles. In one embodiment, the silica particles in the slurry are surfactant-templated mesoporous silica particles. These silica particles can be prepared by: precipitating the surfactant-templated mesoporous silica particles; milling or grinding the particles to a preselected size; and introducing the particles in a solvent or a mixture of solvents to form the slurry. The slurry can be prepared by: mixing a quantity of silicate particles of a preselected size with a binder in a solvent or a mixture of solvents that provides a preselected viscosity.

In one embodiment, the slurry has a viscosity that is at least about 4000 (cP). In another embodiment, the slurry includes a binder that is an organic binder. In another embodiment, the binder is an organic binder.

In yet another embodiment, the organic binder is dissolved in a solvent that includes a polymer. In one embodiment, the binder is dissolved in the solvent carbitol acetate that includes a polymer, i.e., polyvinyl butyral (PVB). In this embodiment, the selected constituents are mixed at a specific ratio of binder, carbitol acetate, and PVB, respectively. In a preferred embodiment, the selected constituents are mixed at a specific ratio of about 1:4.4 (silica particles: binder), which is not limited.

In another embodiment, the slurry includes at least one binder particle. The binder particles can include various materials including, e.g., metals; polymers; ceramics; oxides, metal oxides, and combinations of these materials. In a preferred embodiment, the binder particle is a metal oxide particle selected from: alumina particles; titania particles; zirconia particles; magnesia particles; and combinations of these classes of metal oxide particles.

In various embodiments, the slurry that forms the generally uniform layer is distributed on a substrate by a process including, but not limited to, e.g., screen-printing; squeegee-ing in conjunction with a flexible or bladed tool to force particles in a paste through a screen in a screen printing process; webcoating; spraying; spreading; dusting; and combinations of these processes. In a preferred embodiment, the slurry is distributed using a screen-printing process at a preselected thickness. The thickness of the film can be achieved in a single screen-printing step or can include a series of screen-printing steps. In various embodiments, the screen-printing process can include use of a mil screen with a mil width of from about 0.2 µm to about 50 µm. In a preferred embodiment, the slurry is distributed as a uniform layer on a surface. The "green" film on the surface is made by heating the layer on the surface at a preselected temperature for a time sufficient to remove any solvent in the slurry. Calcining temperatures of the film can be adjusted up or down to change properties of the film. In one embodiment, calcining (sintering) of the thin film on the surface is performed at a temperature of from about 300° C. to about 650° C. to form a thermally stable film on the surface. In another embodiment, calcining (sintering) of the layer is performed at a temperature of about 550° C.

In one embodiment, the thin film is functionalized using an organosilane self-assembly material. Functionalization of the thin film can also be carried out in routine organic solvents, in supercritical fluids, or in the vapor phase. Functionalizing of the thin film includes use of a functionalizing ligand, e.g., thiols, carboxylates, sulfonates, phosphonates, amines, phosphines, ammonium salts, phosphonium salts, etc., that are further bound to a tethered anchor, e.g. an organosilane. Preselected ligands in the film bind selectively to preselected analytes when contacted by the analytes, e.g., in a fluid or a gas.

The invention also includes a method for using a porous thin film to preconcentrate a preselected analyte. The method includes the steps of: contacting the porous thin film that is affixed to a preselected substrate with a fluid that contains a preselected analyte. The film comprises silica particles of a generally uniform distribution having a multimodal pore size distribution and an open interface. The film is functionalized with at least one tethered ligand that selectively binds to a preselected analyte or analytes in a fluid, which preconcentrates the analyte or analytes in the film in contact with the fluid or the gas. The method further includes a step of determining the analyte or analytes that are preconcentrated in the film using a preselected analytical process or instrument. In one embodiment, the analytical process or instrument is an XRF process or instrument. In another embodiment, the thin film is affixed to a disk that is used as a sampling disk to preconcentrate an analyte or analytes in a fluid sample that is subsequently submitted for direct analysis. Disks can be used to preconcentrate analytes present in fluid samples collected at remote locations distant from an analysis location for later analysis without the need to ship or store fluids sampled or collected at the remote location. Direct interrogation of the sampling disk by a probe instrument provides a direct determination of analytes present in the thin film, which correlates with concentrations of analytes present in the samples collected at a distant location, e.g., heavy metals in a water sample at an environmental site, or trace metals in a waste effluent at a metal refinery. A preferred probe instrument for heavy metal determination is an XRF instrument that determines the analytes preconcentrated from a fluid sample. Because sampling disks are not consumed during analysis, disks can be archived for future reference, or can be analyzed again for quality control purposes, e.g., for sample chain-of-custody, and for other legal purposes. Samples disks can be labeled, e.g., with barcodes to assist in the automation and archiving of collected samples. In a preferred embodiment, the sample disk is comprised of an inexpensive low-Z element material including, but not limited to, e.g., Si, $SiO_2$, carbon, Ti/$TiO_2$, and like elements or materials to provide inexpensive, low background devices. In XRF analysis, the functionalized nanoporous thin films enhance analyte detection limits in a fluid sample, concentrating the analyte present at a low concentration level in the fluid up to a higher level in the film. Solution levels can range from parts-per-million down to sub part-per-billion levels, while concentrations in the sampling discs can be orders of magnitude higher. The porous thin films of the invention can be used as a component of a sampling and analysis system or device. In other applications, the thin films of the invention can be used as a component of a sensor or a sensor system. In other applications, the thin films of the invention can be used as a component of an assay kit or process for determination of heavy metals in, e.g., drinking water, waste streams, and effluents, e.g., metal refining effluents. No limitations are intended.

DETAILED DESCRIPTION

Figure 1:
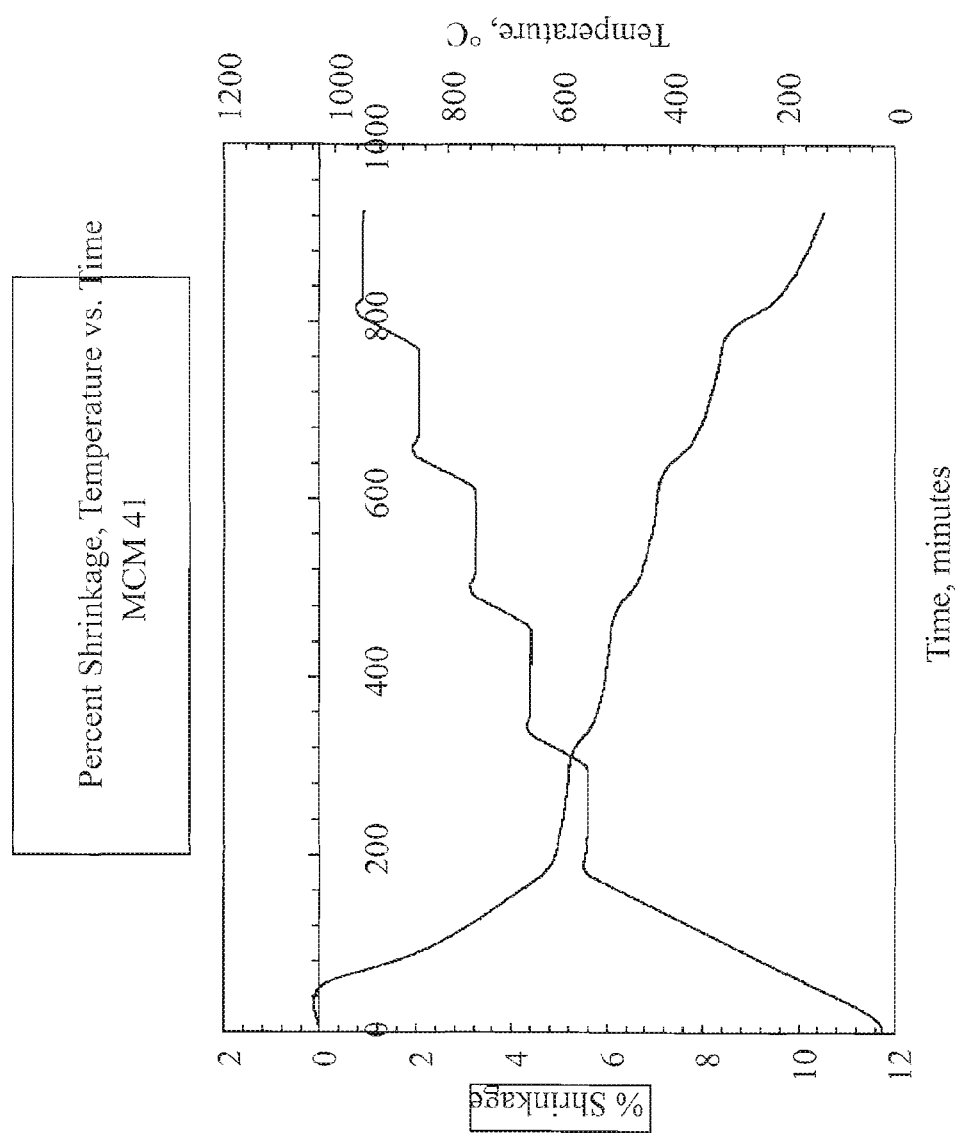
FIG. 1 presents dilatometry results for a pressed pellet composed of porous silica that has been both ball milled and attrition milled.

The present invention in one aspect is a porous thin film that preconcentrates analytes in a fluid that contacts the film. Preconcentration of the analyte permits a determination of the analyte, e.g., for characterization, or testing, of the fluid sample. The thin film includes a multi-modal pore structure comprised of both mesoporous particles of a preselected size and macropores defined by open spaces between particles. The film has an open interface, meaning that the pore structure is easily accessible to fluids including solution-borne reagents. The film has a high surface area, is highly permeable, and has a good physical and hydrothermal stability. When affixed to a surface or substrate, the film is generally uniformly distributed and has a preselected thickness. In one embodiment, the film is a conformal porous thin film, but is not limited thereto. Once the porous film is made, the film can be functionalized with preselected ligands that impart chemical specificity to the film, e.g., for capture, and preconcentration of, a preselected analyte or analytes. The porous silica films of the invention prepared by the process of screen printing are readily functionalized. The process of functionalization can be carried out either in routine organic solvents or in supercritical fluids, and can involve various ligands, e.g., as detailed in U.S. Pat. Nos. 7,019,037; 6,846,554; 6,753,038; 6,733,835; 6,531,224; and 6,326,326, which patents are incorporated in their entirety, herein. Once functionalized, these thin films can be used to selectively capture and preconcentrate analytes in fluid samples, for use in catalysis and chemical separations. Because of the uniform structure and properties of these thin films, the films can be subjected to direct spectroscopic interrogation, which greatly simplifies both the sampling procedure and the analytical protocol. Porous thin films described herein were prepared using an exemplary surfactant-templated mesoporous silica, also known by the tradename MCM-41® (Exxon Mobil Corp., Irving, Tex., USA), that retains its pore structure in the films. While use of MCM-41® silica is described, the invention is not limited thereto. Those of skill in the ceramic processing and material arts will readily recognize that methods of the invention will be equally useful for silica particles derived from other particle and ceramic sources, e.g., precipitated silica, silica gels, chromatographic silica, and like sources. Thus, no limitations are intended by the description to the preferred embodiments described herein. All ceramic particles as will be contemplated or implemented by those of skill in the ceramic processing arts in view of the description of the invention are within the scope of the invention. No limitations are intended. Attrition milling and ball milling are processes whereby large particles are ground to smaller particles using non-degradable grinding media, e.g., using a horizontal rotating vessel filled with a grinding media that continuously contact the material and systematically grind the edges of the particles down. Attrition milling and ball milling create spherical particles that can be well-characterized. Effect of milling on the structure of silica particles described herein is summarized in TABLE 1.

TABLE 1

Effect of milling on structure of silica particles.

| MCM-41 | Before milling | Attrition Milled** & Ball Milled* | Ball milled** |
|---|---|---|---|
| Particle size: (μm) | 38 | 0.32 | 0.72 |
| Surface area: (m²/g) | 857 | 585 | 870 |
| Pore size: (Å) | 35 (ordered) | 35 (disordered) | 35 (ordered) |

*1 week
**4 hours

Results in TABLE 1 show that after milling, average particle size of the silicate particles decreases to below 1 micron in each case. Ball milling for 4 hours did not negatively impact pore structure, or surface area. Conversely, samples that are subjected to both attrition milling and ball milling not only have a smaller particle size, but also have a lower surface area, as well as a disordered pore structure. Extended milling breaks down the ordered hexagonal pore structure of the silica particles and results in fragments that begin to agglomerate.

Shrinkage and Surface Area Results

Figure 2:
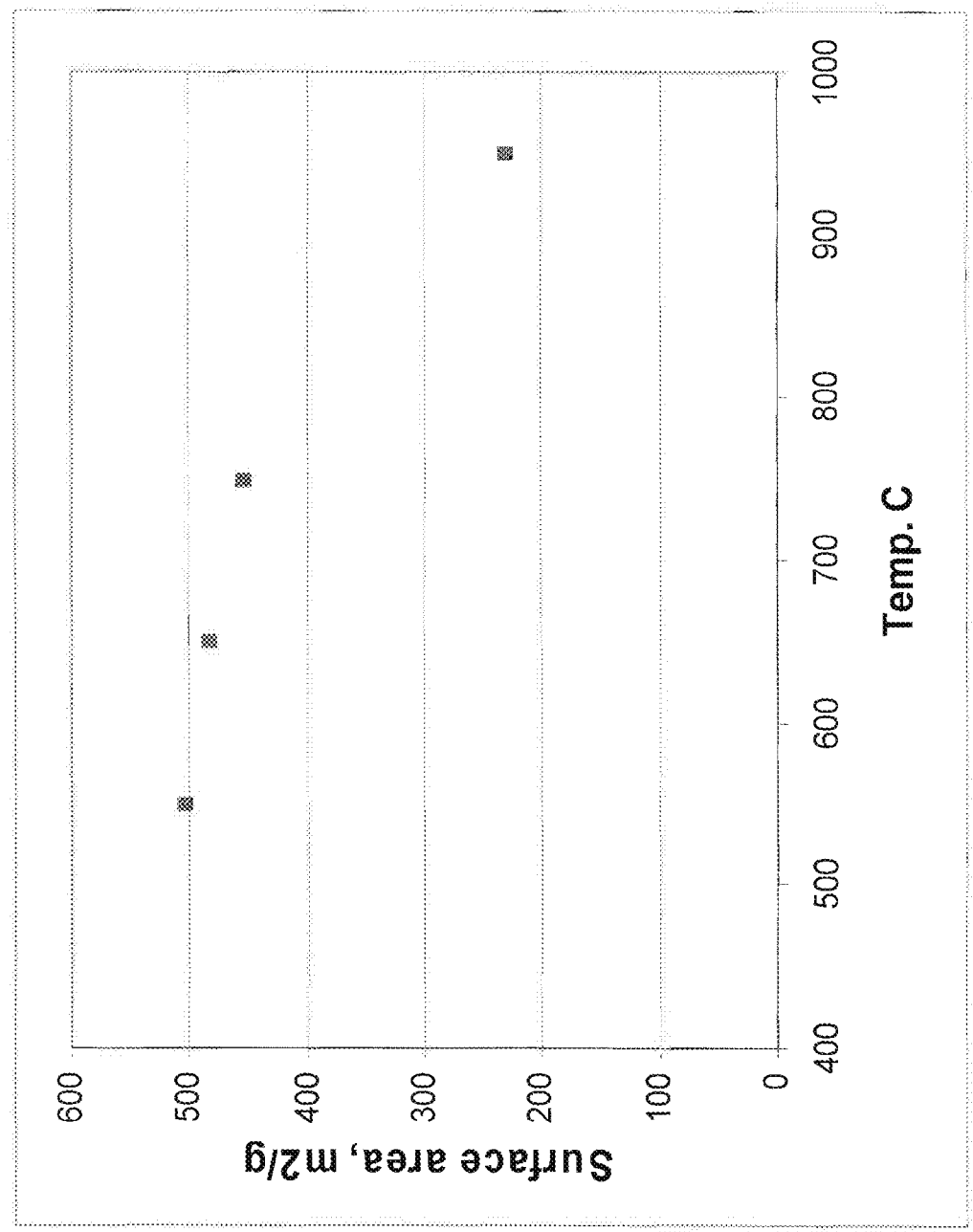
FIG. 2 presents surface area measurements of attrition milled and ball milled silica as a function of temperature.

FIG. 1 presents dilatometry results for a pressed pellet composed of mesoporous silica particles (i.e., MCM-41) that were attrition milled and ball milled. Dilatometry results correspond to changes in volume, or dimensions, that occur as a consequence of heating. In the figure, percent (%) shrinkage and temperature are plotted as a function of time. In the figure, results show mesoporous silica undergoes approximately 5% shrinkage when slowly heated to 550° C. over a period of about 3 hours. At 550° C., partial sintering of the particles takes place, which contributes to the final structure of the porous thin film. Continued shrinkage of the particles occurs up to a temperature of 950° C., with a dramatic increase in the shrinkage of the pore structure of the silicate particles above a temperature of about 600° C. Change above 600° C. is attributed to collapse of the pores of the mesoporous structure, which results in a dense, less porous structure. Measurements were also carried out to determine the surface area of the silicate particle films as a function of temperature. FIG. 2 presents surface area measurements for attrition milled silica (e.g., MCM-41®) particles as a function of temperature. Before heating, silica particles had a surface area of 585 m²/g. In the figure, surface area decreases with increasing temperature. Data show that surface area begins to decline at a temperature of about 600° C., with a marked decrease above a temperature of about 750° C. Decline in surface area is again attributed to collapse of pores and densification of the pore structure in the silica particles at higher temperatures.

Preparation of the Porous Thin Film Control of Porosity (Maintained Hexagonal Pore Structure)

Figure 3:
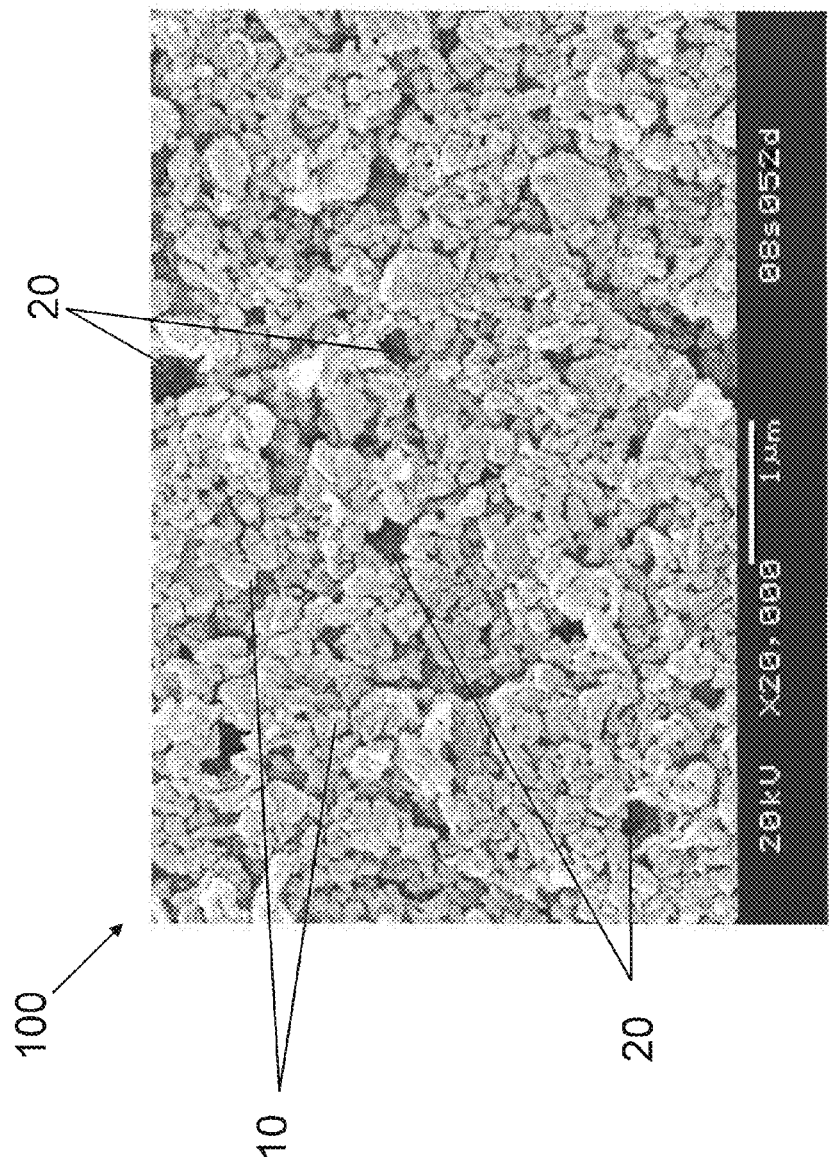
FIG. 3 is a scanning electron micrograph (SEM) of a screen-printed silica film that shows the open porosity of the film's interface.

Screen-printing provides a fast and easy process for preparation of the thin films of the invention, which processes are amenable to mass production. The slurry (or paste) for screen printing is usually prepared by mixing milled particles with a binder. A quantity (e.g., 3-10 grams) of milled (e.g., ball-milled and/or attrition milled) silica particles prepared from, e.g., a MCM-41® silica surfactant templating material (Exxon Mobil Corp., Irving, Tex., USA), are optionally mixed with a screen-printing binder. To achieve good uniformity and distribution of the slurry in the screen-printing process, it is preferable to reduce particle size of the starting silica powder. Particle size of mesoporous $SiO_2$ can be reduced to sub-micron sizes using ball milling or attrition milling. A ball mill time of about 4 hours is preferred, but is not limited thereto. By controlling the mill time, it is possible to maintain the ordered pore structure and symmetry of MCM-41®. The binder in the paste serves as a medium that ensures uniformity of the screen-printing layer. Morphology of the film and the film interface is particularly important to the function of the film. For example, in order to take full advantage of all of the silica's surface area, it is important that all of the porosity of the thin film be retained in the screen-printed and calcined (sintered) thin film. Use of a granular silica precursor is also preferable in order to create an inherent macroporosity different from that provided by the particle porosity, which enhances mass transport into the film. The mass transport properties are useful for both functionalization of the film and for speed of preconcentration of the analyte in the film. In addition, the macroporosity of the film connects the film's surface to the porosity derived from the particles themselves in the underlying film. FIG. 3 is a scanning electron micrograph (SEM) that shows a typical screen-printed mesoporous silica (MCM-41®) film 100 prepared according to the method of the invention. Silica particles 10 in the film are generally uniformly distributed on the selected substrate (not shown). Particles have a preferred size in the film of from about 100 nm to about 500 nm, which sizes are not limited. The silica particles contain mesopores (not shown) that range in size from about 35' to about 200'. Macropores 20 are also observed in the film between the sintered silica particles and have a size that ranges from about 100 nm to about 500 nm. Presence of silica particles in the film with their mesoporous structure, and associated macropores between the particles, results a generally open, multi-modal pore size distribution throughout the dimensions of the film. In the figure, the open macroporosity of the film's interface is clearly evident. The film also has an open film interface, which means the film does not form a "skin" at the interface that impedes diffusion of fluids into or out of the porous thin film that would curtail its utility as a preconcentrator or a sensor. "Mud cracking" (i.e., splitting) is also prevented in these films due to the high packing density of the particles within the viscous screen-printing paste and the use of slow drying. XRD analysis (not shown) confirmed that the hexagonal pore structure of the silica particles is maintained in the final thin film. In short, porosity features and open interface of the film provide the film with capacity for preconcentration of fluid analytes that contact the film. Use of a granular silica precursor does not induce or introduce significant stress fields into the films during the curing of the films. Thus, the films are hydrothermally stable porous thin films and do not require a capping layer to passivate the surface.

Film Thickness

Figure 4A:
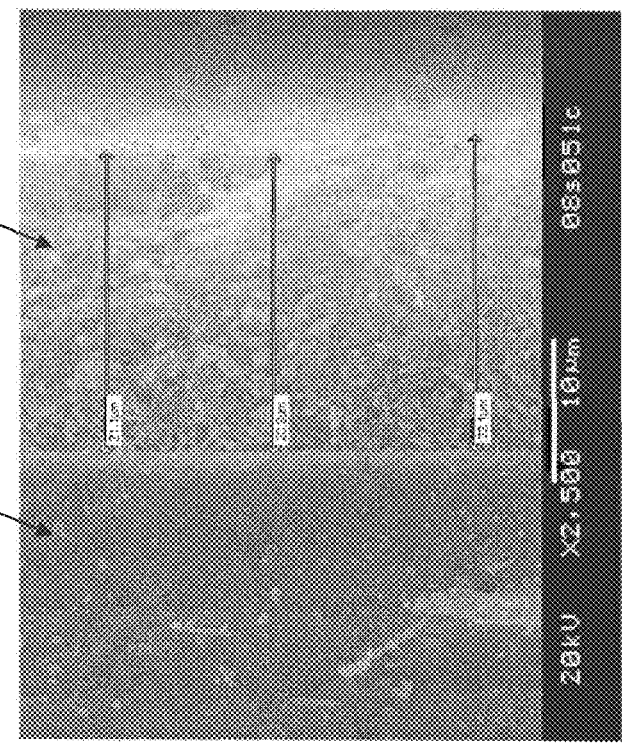
FIG. 4a-4b present cross-sectional SEMs showing film thickness of two different films made by screen-printing.
Figure 4B:
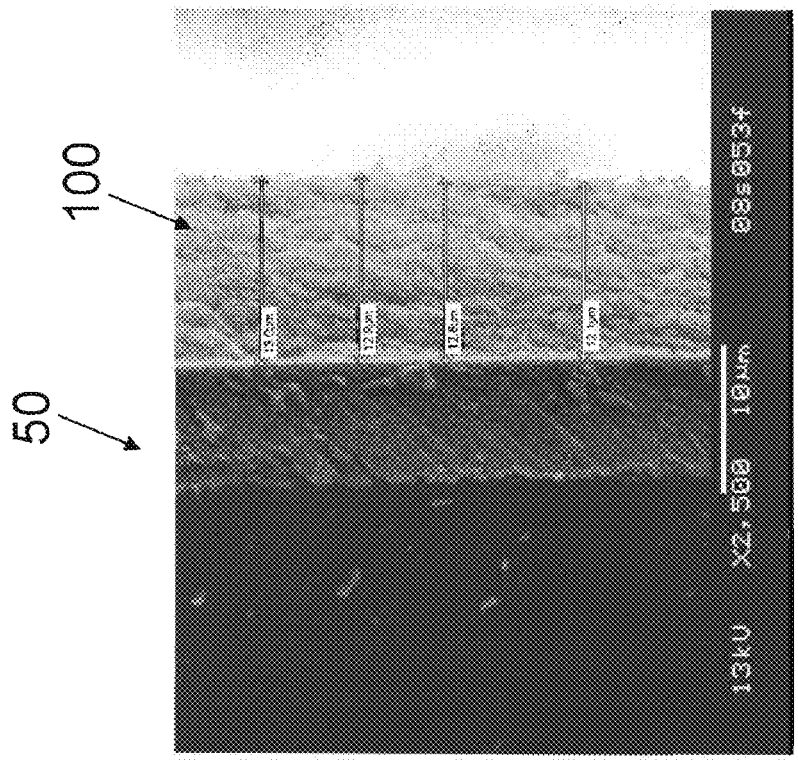

For spectroscopic interrogation of preconcentrated analytes (i.e., XRF analysis), film thickness is controlled within certain parameters so that optical, electronic, or physical properties most amenable to the spectroscopic detection scheme or intended application are maintained. Screen thickness and slurry viscosity are principal parameters for producing thin films suitable for spectroscopic interrogation. Film thickness is preferably selected between about 1 micron and about 20 microns, but is not limited. Thickness of the film on the surface can be controlled using a screen of a preselected thickness and screen density. Thickness may also be controlled by the number of times a film or layer is printed on the substrate. For example, the screen-printing process can involve a single screen-printing step or more than one step, or can involve a series of screen-printing steps in order to achieve the desired film thickness. Viscosity for screen-printing of thin films for spectroscopic interrogation is preferably between about 4000 centipoise (cP) and 30,000 (cP), but again is not limited thereto. In other processes, viscosity can be selected in the range from about 1 (cP) to about 4,000 (cP). For example, viscosity for distribution of a slurry using a spin-coating process or a spray coating process can be lower than for a screen-printing process. And, viscosity of slurries using a dip coating process can be yet lower, e.g., as low as 1 (cP), which can produce film thicknesses as low as 0.1 micron. Viscosity is controlled by adjusting quantity of the particle powder, the binder, and the solvent ratio in the slurry mixture. For lower density and higher surface area (e.g., mesoporous silica) powders, a higher binder weight ratio is needed (e.g., $SiO_2$: binder=1:4). For higher density and lower surface area (e.g., yttrium-stabilized zirconia (YSZ)) powders, a lower binder weight ratio is needed (e.g., YSZ: binder=1:1). Film thickness is controlled by the thickness of the screen, or by the number of times the film is printed. Sintering conditions also effect film thickness. In exemplary tests, slurries containing the silica particles were screen printed on substrates using screens (Sefar Printing Solutions Inc., Ontario, Calif., USA) with thicknesses of from 0.8 mils to about 2 mils, which thicknesses are not limited. FIG. 4a-4b are SEMs that show cross-sections of two exemplary porous thin films 100 of the invention distributed on a substrate 50 by a screen-printing process at two representative film thicknesses. In FIG. 4a, the film is a 12 micron thin film made by using a 1 mil (0.001 μm) thick screen. In FIG. 4b, the film is a 21 micron thick film made using a 2 mil (0.002 μm) thick screen. As shown in the figures, films made using the screen-printing technique are uniform and the thickness is controllable using screens of a preselected thickness. However, thicknesses are not limited. For example, screens for screen-printing can be selected in the range from about 0.2 microns to about 50 microns. Thus, no limitations are intended.

Calcination (Sintering) of Thin Films

Figure 5B:
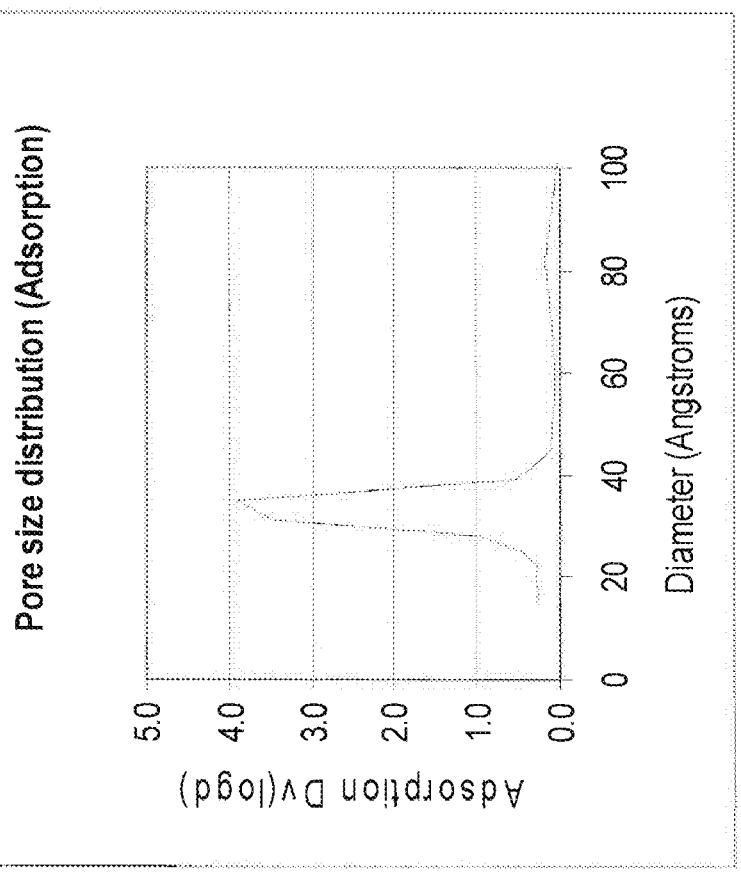
FIG. 5a-5b present gas adsorption data and pore size distribution data, respectively, for a screen printed/sintered thin film.
Figure 5A:
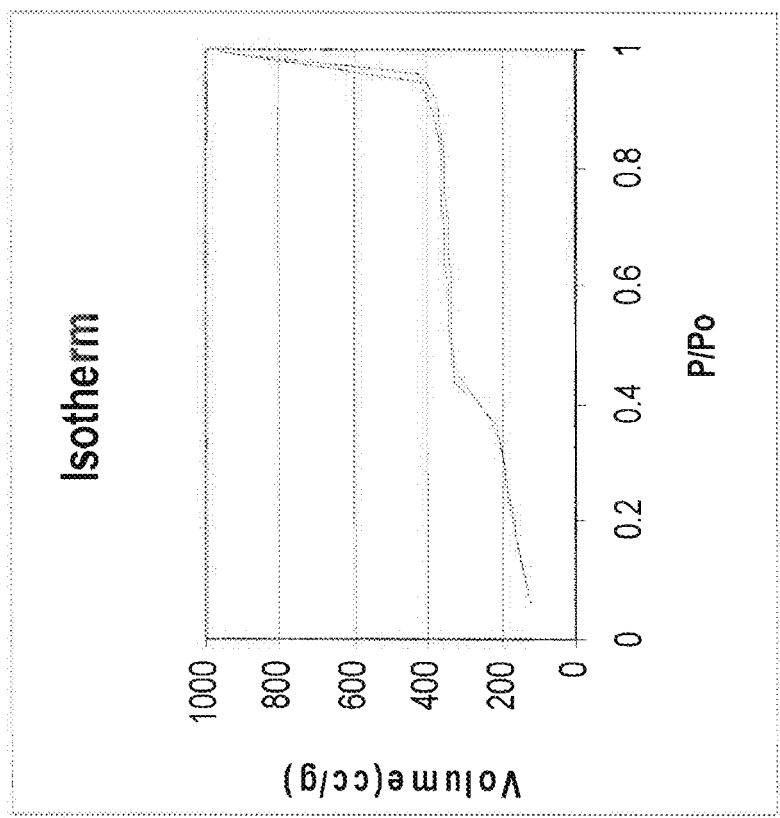

Slurries distributed onto a surface of a substrate are typically dried overnight at, e.g., 100° C., to remove solvents or fluids from the slurry which serves to form the "green" films on the surface of the substrates. The ceramic thin films are then sintered (calcined). Sintering (calcining) is the process by which the silica particles in the thin film bond to surfaces of adjacent silica particles by heating below the melting point until the particles adhere to each other in the film. Since these films contain a porosity that is multimodal (e.g., contains both 35 Å macropores and 0.1 μm-0.5 μm structural mesopores), and no "skin layer", permeability of these films is high. Thus, these films are effective for analyte preconcentration of fluid analytes that provide for enhanced spectroscopic analysis. In order to take full advantage of all of the silica's surface area, it is important that the porosity (e.g., mesoporosity) of the thin film be retained in the calcined thin film. By judicious choice of calcining (sintering) conditions, e.g., preferred temperatures of between about 450° C. to about 550° C., it is possible to retain the same pore structure in the final film that is present in the precursor (e.g., mesoporous) $SiO_2$ powder. For example, in an exemplary process, bare films calcined (sintered) at 550° C. for 4 hours showed good hydrothermal stability. These temperatures and times are exemplary only and should not be considered limited. FIG. 5a-5b present gas adsorption data for the screen printed thin films following deposition on the substrate surface and following calcination. Characterization of the structure of these films by gas adsorption assay demonstrates that the nanoporous structure of the silica particles in the film is maintained. For example, adsorption isotherms in FIG. 5a show particles in the screen-printed thin films retain their surface area. And, data presented in FIG. 5b show that the pores (e.g., the 35 Å mesopores and 80 Å macropores) and distribution of pore sizes in the screen-printed films survive the calcining process. XRD analysis (not shown) confirmed that the hexagonal pore structure is maintained in the final film.

Hydrothermal Stability

To be an effective analyte preconcentrator of aqueous or fluid media, the porous thin film must demonstrate sufficient hydrothermal stability to survive sampling conditions. In addition, the analyte must diffuse into the pore structure and be retained by the film, e.g., in conjunction with pendant surface chemistry. Mesoporous thin films prepared according to the method of the invention were tested for hydrothermal stability by measuring hydrolytic degradation in water. Tests were conducted on unfunctionalized films in the absence of a coating of silane that passivates films against hydrolysis and condensation chemistries. Films were soaked in water for 1 hour. Film thickness and mass were determined before and after immersion. Results are summarized in TABLE 2.

TABLE 2

Summary of the hydrothermal stability testing.

| Sample | Substrate | Screen (mils) | Film thickness (μm) | Wt lost (%) |
| --- | --- | --- | --- | --- |
| 156-1 | Glass | 2 | 21 | 0.0 |
| 156-3 | Glass | 1 | 12 | 0.1 |
| 158-Al-0 | Al | 1 | 10 | 0.0 |

Figure 6:
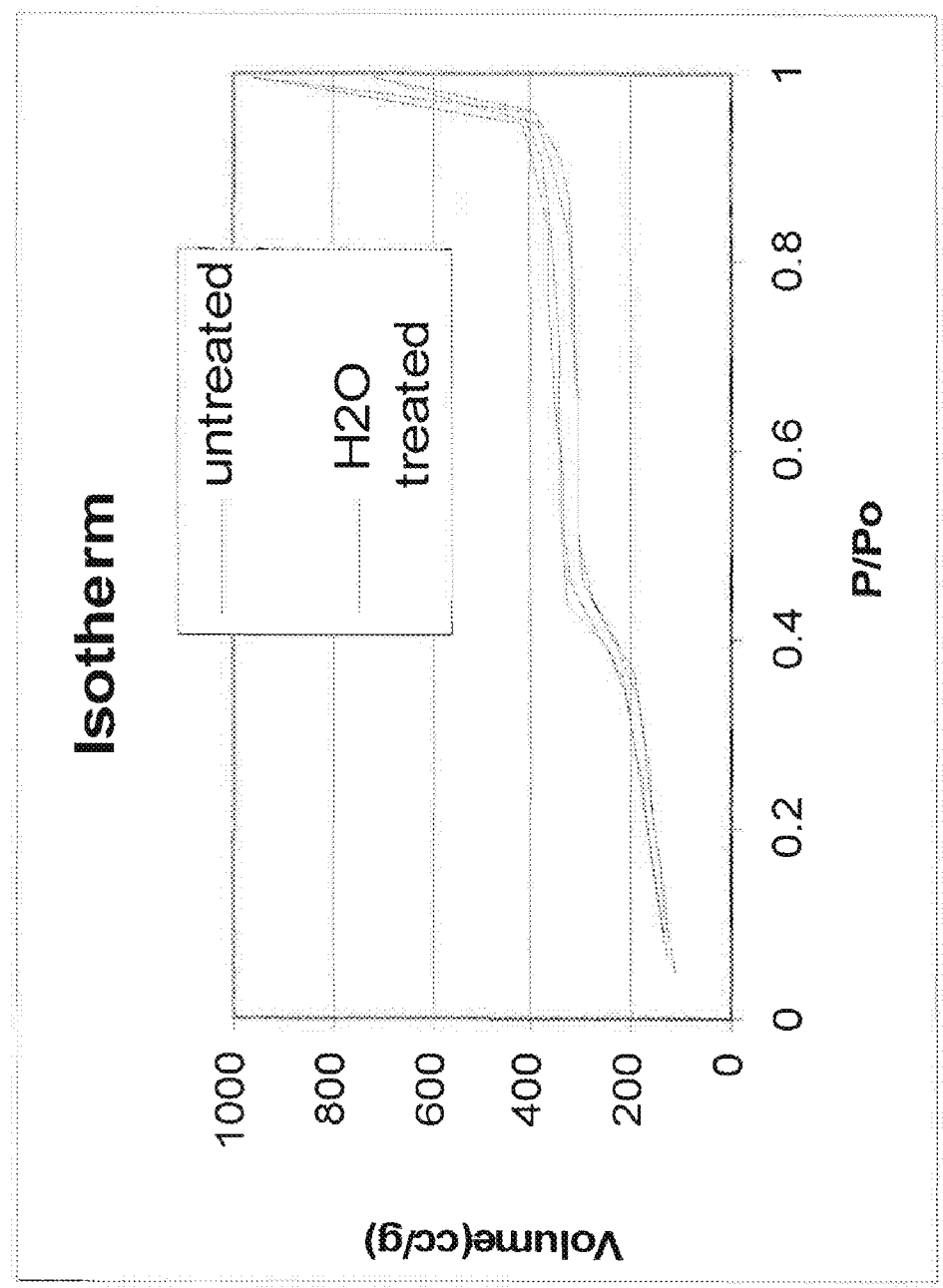
FIG. 6 is an adsorption isotherm for screen-printed thin films, before and after immersion in water.

Results show negligible weight loss and an absence of delamination and/or dissolution in these films. Results are attributed to minimization of horizontal strain forces in these films during production. FIG. 6 plots adsorption isotherm data for screen-printed thin films before and after immersion in water. Isotherms before and after immersion in water are essentially identical, which shows the thin films of the invention are hydrothermally stable. The untreated (non-immersed) film had a surface area of 611 $m^2/g$, as measured by Brunauer-Emmett-Teller (BET) tests (not shown). The film had a surface area of 541 $m^2/g$ after immersion in water for one hour. Decrease in surface area is due to a minimal quantity of pore collapse that results in the absence of a passivation layer at the surface of the film. Pore collapse at the surface can be avoided with use of, e.g., addition of an organosilane monolayer at the surface of the film. However, applications testing of functionalized films has shown there is no change in performance after hours of immersion in aqueous solutions.

XRF Coupling for Trace Level Metals Determination

XRF is a useful multielemental technique for the analysis of solids. XRF instruments are much easier to operate, cheaper and portable. With an effective preconcentration and sampling device, XRFs can be utilized for, e.g., trace level assay of drinking water, and other trace level determinations, e.g., of trace metals. The invention includes a process of coupling functionalized nanoporous thin films (FNTF) of the invention with direct analyses of the analytes as provided by X-ray fluorescence spectroscopy (XRF). The FNTF is used to coat the surface of, or is affixed to, a sampling (sampler) disc that conveniently works with XRF instrumentation. The functionalized nanoporous thin films of the invention provide very high capacities and affinities, e.g., for toxic metals that enable unparalleled preconcentration factors for the analytes of interest. To date, preconcentration factors of at least about 5000× have been demonstrated. Preconcentration factors are attained while providing a stable sample matrix in which to measure. The stable measurement matrix provided by the thin film on the modified sampling disc reduces measurement fluctuations that stabilize the measurement baseline resulting in better sensitivity and stability. The discs work conveniently with XRF instrumentation, which provides both a simple dip-and-store process for analyte preconcentration, and a process for direct determination of the preconcentrated analytes. Analytical sensitivity increases for XRF detection are so significant that it will make XRF coupled with FNTF a powerful and cost-effective tool for detecting trace level heavy metals in aqueous environments. Placing the preconcentration film on a support that provides: a low noise or background level, easy sampling process, stable transport mechanism, a solid sample for chain or custody for record purposes or resolution of legal issues, and a direct and automated XRF analysis is unique. In addition, coupling the FNTF thin film technology of the invention with a sampling platform can provide an increase in the XRF detection limits for trace analysis of, e.g., heavy metals in liquids or gases by a factor of from $10^3$-$10^6$ times. For example, when FNTF-coated samplers are coupled with XRF, the instrument's analytical sensitivity may increase from a parts-per-million (ppm) detection level for trace analysis of analytes in liquids to a parts-per-billion (ppb) and feasibly even to a parts-per-trillion level of detection. FNTF technology of the invention does this by providing a uniform, low-background (thin film) matrix that selectively preconcentrates a targeted class of metals (e.g., heavy metals) from liquids and gases, creating a solid sample with a high metal concentration loading for XRF analysis. The XRF sampler presently envisioned is a small, flat disc made of a glass, a ceramic, aluminum, or another suitable low-Z material including, e.g., carbon, $Al/Al_2O_3$, Si, $SiO_2$, Ti, $Ti/TiO_2$, TiO, or thermally stable polymers, and like materials that can be coated on at least one side with the FNTF. A simple sampling process consists of dropping the FNTF-coated sampler into a container containing a measured aliquot of a liquid to be tested. The film on the sample disc quickly extracts, traps, and concentrates the targeted metals from the liquid. The sampling disc can then be stored until it can be placed into the XRF instrument for direct analysis and determination of the analyte or analytes present in the original liquid sample. XRF completes the analysis within minutes, rendering the concentration measurement of the heavy metal(s) in the thin film, which correlates with the concentration of the metal or metals in the original liquid sample. Other sampling procedures and methods that reduce FNTF loading time, increase sensitivity and enable diverse applications can be considered. While XRF is described herein as an instrument for direct determination of analytes preconcentrated in the thin films of the invention, the invention is not limited thereto. Functionalized thin films of the invention that preconcentrate fluid analytes are expected to be applicable to other types of spectroscopic analyses including, e.g. UV-VIS, fluorescence spectroscopy, and other instrumental analyses. Thus, no limitations are intended by disclosure to a specific instrument type or instrument analyses.

Applications

Determination of toxic metals in water is becoming increasingly important. Water assay techniques typically require expensive and heavy equipment not readily accessible in the field, which also can produce secondary waste streams of gaseous effluents. Such systems often require trained technical professionals as well as cumbersome transport of containers of carefully stabilized, pre-treated liquid samples back to the instrument for analysis. Cost per sample can be prohibitive both for home sample testing as well as tests for municipal, industrial, or government clients. Functionalized Nanoporous Thin Films (FNTF) of the invention present a technology that is easy-to-use, does not require complex chemical pre-treatment, transport of liquid samples, or large complicated instruments. The films couple preconcentrate metals or combinations of metals of interest for direct determination and analysis using X-ray Fluorescence Spectroscopy (XRF), an assay that provides a stable background, and provides enhanced and improved analytical sampling capability. FNTF samplers provide a fast sampling time, efficient sample handling, analysis for multiple and/or selected elements, and a stable baseline for sampling standards. The low cost of sampler discs and ease of sampling can broaden testing capabilities, e.g., to include home water-sampling kits that can be mailed by a user to a testing laboratory for XRF analysis. The invention can also be used to preconcentrate and analyze for, e.g., precious metals (e.g., silver, gold, platinum, rhodium, and like metals) in applications that include, but are not limited to, e.g., catalysis, refining, chemical processing, and material recovery. In other applications, the invention can be used to assay valuable rare earth elements, e.g., lanthanides, in fluid samples for a determination of their purity; or for a determination of mercury (Hg) content in crude oils and other petroleum products; or for monitoring safety and efficiency of industrial cooling and processing solutions, and other fluid assay determinations and analyses. No limitations are intended. The following examples will further assist in the understanding of the invention.

EXAMPLE 1

Substrates Cleaning and Pre-Treatment

Glass substrates were pre-treated to clean the substrates before screen-printing the thin films. Glass cover slips (substrates), e.g., CIR-2 cover slips (Fisher Scientific, Pittsburgh, Pa., USA) were washed with 2-propanol and air-dried. Aluminum disks (e.g., 40-mm diameter, 0.5 mm thick, Goodfellow Cambridge Ltd., Pittsburgh, Pa., USA) were first washed with 2-propanol, then soaked in 0.1 M HCl solution for 10 min, then heated on a hot plate to 325° C. for 10 min. Cleaned substrates were placed on a glass vacuum plate.

EXAMPLE 2

Screen Printing Thin Films Using Silica Slurries

Screen-printing paste (4000 cP viscosity) was prepared by mixing ball-milled silica powder (e.g., MCM-41®, <1 micron) with an organic screen-printing binder (e.g., B-75717® binder, Ferro Corporation, Cleveland, Ohio, USA) at a weight ratio of 1 to 4.4 (MCM-41® particles: binder). The binder included Polyvinyl Butyral (PVB) polymer dissolved in a high-boiling (219° C.) solvent, Carbitol Acetate. Binders are not limited. Cleaned substrates were placed on a glass vacuum plate. A screen of desired thickness (e.g. 400 mesh, with a 1.0 mil wire width) was placed over the top of the substrates, but not in contact with the substrates. Paste was subsequently placed on top of the screen. A squeegee was used to push the paste through the screen, which forced the mesh down in contact with the substrate. Slurry introduced through the mesh transfers by capillary action to the substrate in a controlled fashion that deposits a quantity of paste approximately equal to the thickness of the screen. As the squeegee moves toward the rear of the screen, the tension in the mesh pulls the mesh up and away from the substrate surface leaving the paste on the substrate surface. At the stated viscosity, slurry spread on the surface yields a film that is roughly half the thickness of the original screen thickness. The distributed slurry was dried at 100° C. for 20 min to remove solvent and affix the "green" film layer. The screen printing process can be repeated to achieve desired thicknesses or layering of the films. Bare films were calcined (sintered) at 550° C. for 4 hours to achieve showed good hydrothermal stability on the substrate surface.

EXAMPLE 3

Functionalization—Either in Organic Solvents or SCF

Mesoporous silica thin films of the invention can be functionalized using, e.g., an organosilane self-assembly process, e.g., as detailed in U.S. Pat. No. 7,019,037; 6,846,554; 6,753,038; 6,733,835; 6,531,224; and 6,326,326, incorporated herein. Functionalization of the thin film can be carried out using routine organic solvents as the reaction medium (e.g. toluene) or can be performed in supercritical fluid (SCF) media. Reactions involving silanes (e.g., tris-alkoxy-silanes) are preferably performed at elevated temperatures. Temperatures above 100° C. are particularly desirable, making refluxing toluene (bp=110° C.) a convenient and widely used solvent for this chemistry. In exemplary tests, 3-Mercaptopropyltrimethoxysilane (3-MPTMS) was used to chemically modify thin films of the invention for heavy metal sorption. Modification of the films was performed in refluxing toluene for 4 hours. The invention is not intended to be limited to use of 3-MPTMS or to a specific silane. Those of skill in the surface functionalization and material arts will recognize that other organosilanes and other ligands can also be used. Use of 3-MPTMS in the instant example was due to a selective preconcentration of "soft" heavy metals such as mercury (Hg), cadmium (Cd) and lead (Pb). Thus, no limitations are intended.

EXAMPLE 4

Performance Data Using XRF 10 micron screen-printed thin films, functionalized with 3-MPTMS, on high purity Al substrates (12.6 cm$^2$, with a Niacol interfacial layer) have shown repeatable ~60% capture of 100 ppb Hg in unfiltered river water (30 mLs, 3 hour exposure on shaker table). For effective reproducible Hg capture on the 3-MPTMS thin film, film was preconditioned with alcohol, enabling effective wetting by the aqueous sample. This results in about a 4000× increase in Hg concentration in the film (relative to solution), enabling the XRF to detect Hg at EPA regulatory levels. Similar films have worked on multi-metal solutions, allowing simultaneous multi-metal analysis. This simplifies sample prep and stabilizes the sample for handling and storage, relative to traditional methods of analysis. Different classes of metals can be similarly preconcentrated by utilizing a different monolayer chemistry in the porous thin film. Thin films of the invention have been successfully deposited on aluminum (Al), steel, glass, and aluminized surfaces. For XRF applications, a preferred film support material can be Al, aluminized glass, or high purity alumina. FNTF films of the invention are physically and hydrothermally stable. The absence of glues or polymer binders limits the introduction of impurities that might complicate the analytical signal, thereby providing a more stable baseline for the analytical procedure. Incorporation of trace amounts of compatible materials within the film may be desirable as a means of creating an internal analytical standard intrinsic to the device.

CONCLUSIONS

This work has demonstrated that it is easy to produce uniform, crack-free 10-20 μm mesoporous $SiO_2$ films using screen printing. For good uniformity in the screen-printing process it is necessary to reduce particle size of the starting silica powder. The particle size of mesoporous $SiO_2$ can be reduced to sub-micron sizes using ball milling or attrition milling. By controlling the mill time, it is possible to maintain the ordered pore structure and symmetry of MCM-41. Thickness of the screen-printed film can be controlled by either the screen thickness, or by using multiple printing steps. By judicious choice of calcining (sintering) conditions, it is possible to retain in the final film the same pore structure as was in the precursor mesoporous $SiO_2$ powder. Bare films calcined at 550° C. for 4 hours showed good hydrothermal stability. Since these films contain hierarchical porosity (i.e. both 35 Å pores and 0.1-0.5 μm pores), and no "skin layer", permeability of these film is high, and these films are effective for analyte preconcentration of fluid analytes for enhanced spectroscopic analysis. While an exemplary embodiment of the present invention has been shown and described, it will be apparent to those skilled in the art that many changes and modifications may be made without departing from the invention in its true scope and broader aspects. The appended claims are therefore intended to cover all such changes and modifications as fall within the spirit and scope of the invention.

We claim:

1. A porous thin film, comprising:
   porous silica particles of at least one size below a preselected size threshold generally uniformly distributed and sintered together on a substrate, the film having a multi-modal pore structure with a plurality of pore types that defines an open interface in the film, with large pores leading to small pores in each of the porous silica particles that provides for preconcentration of analytes therein.

2. The film of claim 1, wherein said particles have a surface area greater than 200 $m^2$/g.

3. The film of claim 2, wherein greater than about 50% of said surface area is chemically accessible.

4. The film of claim 2, wherein said film has a thickness selected in the range from about 0.1 μm to about 30 μm.

5. The film of claim 2, wherein said film has a thickness selected in the range from about 0.3 μm to about 30 μm.

6. The method of claim 2, wherein said film has a thickness that is selectable in the range from 0.5 μm to about 50 μm.

7. The film of claim 2, further comprising a preselected quantity of a preselected material selected from the group consisting of: a ceramic, a metal, an oxide, and combinations thereof.

8. The film of claim 1, further comprising a ligand operatively coupled to said particles selected from the group consisting of: thiols, carboxylates, sulfonates, phosphanates, amines, phosphines, ammonium salts, phosphonium salts, and combinations thereof, said ligand selectively binds to and concentrates a preselected analyte from a fluid in said film when contacted by said analyte.

9. The film of claim 1, wherein said uniform distribution of said film is obtained by a process of screen-printing.

10. A preconcentrator comprising a thin film, the preconcentrator characterized by:
    porous silica particles generally uniformly distributed on a substrate and sintered together in the thin film at a preselected thickness, the film has a multi-modal pore size distribution that defines an open interface, with large pores leading to small pores in each of the porous silica particles that provides for preconcentration of analytes therein.

11. A method for making a porous thin film, comprising the steps of:
    distributing a slurry comprising porous silica particles of at least one size below a preselected size threshold in a preselected solvent upon a substrate forming a generally uniform layer of a preselected thickness thereon;
    calcining the porous particles together to form a multi-modal pore structure with a plurality of pore types that defines an open interface in the porous thin film, with large pores leading to small pores in each of the porous silica particles; and
    functionalizing the pores in the silica particles with preselected ligands that provide capture sites for preconcentration of analytes therein.

12. The method of claim 11, wherein the step of distributing said slurry to form a generally uniform layer is performed using a process selected from the group consisting of: screen-printing; web-coating; dip-coating; spraying; squeegee-ing; spreading; dusting; and combinations thereof.

13. The method of claim 12, wherein the step of distributing said slurry to form a generally uniform layer is performed using a screenprinting process.

14. The method of claim 13, wherein said screen-printing process that forms said generally uniform layer includes one or more screen-printing steps that provide a preselected film thickness.

15. The method of claim 13, wherein said screen-printing process includes use of a printing screen with a mil width selected in the range from about 0.2 μm to about 1 μm.

16. The method of claim 11, wherein said silica particles in said slurry are surfactant-templated mesoporous silica particles.

17. The method of claim 16, wherein said silica particles in said slurry are prepared by: precipitating said surfactant-templated mesoporous silica particles; milling said particles to a preselected size; and introducing said particles in a solvent or a mixture of solvents to form said slurry.

18. The method of claim 16, wherein the step of distributing said slurry includes use of a slurry prepared by: mixing a quantity of silicate particles of a preselected size with a binder in a solvent or a mixture of solvents that provides a preselected viscosity.

19. The method of claim 18, wherein said binder is an organic binder.

20. The method of claim 18, wherein said slurry has a viscosity of at least about 4000 (cP).

21. The method of claim 18, wherein the step of distributing said slurry includes the step of heating said layer on said surface at a preselected temperature for a time sufficient to remove said solvent and form a "green" film layer prior to calcining said layer.

22. The method of claim 11, wherein said slurry includes an organic binder.

23. The method of claim 22, wherein said organic binder is dissolved in a solvent that includes a polymer.

24. The method of claim 23, wherein said polymer in said solvent is polyvinyl butyral mixed in carbitol acetate.

25. The method of claim 11, wherein said slurry includes at least one binder particle.

26. The method of claim 25, wherein said at least one binder particle includes a material selected from the group consisting of: a metal; a polymer; a ceramic; an oxide, a metal oxide; and combinations thereof.

27. The method of claim 26, wherein said at least one binder particle is a metal oxide particle selected from the group consisting of: alumina; titania; zirconia; magnesia; and combinations.

28. The method of claim 11, wherein the step of calcining said layer includes use of an annealing temperature selected in the range from about 350° C. to about 950° C. that forms a thermally stable film on said surface.

29. The method of claim 11, wherein the step of calcining said layer includes use of an annealing temperature of about 550° C. that forms a thermally stable film on said surface.

30. The method of claim 11, wherein the step of calcining said layer includes use of an annealing temperature of about 650° C. that forms a thermally stable film on said surface.

31. The method of claim 11, wherein the step of functionalizing said thin film includes use of an organosilane self-assembly material or process in a supercritical fluid.

32. The method of claim 11, wherein the step of functionalizing said thin film includes use of a tethered functionalizing ligand selected from the group consisting of: thiols, carboxylates, sulfonates, phosphonates, amines, phosphines, ammonium salts, phosphonium salts, and combinations thereof, said ligand selectively binds to and concentrates a preselected analyte from a fluid when contacted by said analyte.

33. A method of using a porous thin film to preconcentrate a preselected analyte, comprising the step of:
   contacting said porous thin film affixed to a preselected substrate with a fluid or a gas that contains said preselected analyte;
   said film is comprised of silica particles of a generally uniform distribution having a multimodal pore size distribution and an open interface functionalized with a ligand that selectively binds to said analyte;
   whereby said analyte is preconcentrated in said film in contact with said fluid or said gas.

34. The method of claim 33, further including the step of: determining said analyte preconcentrated in said film using a preselected analytical process or instrument.

35. The method of claim 34, wherein said analytical process or instrument is an XRF process or instrument.

36. The method of claim 35, wherein said substrate that includes said film is a planar support of glass, alumina, or alumina.

37. The method of claim 35, wherein said film provides a detection limit for determination of said analyte in said fluid or said gas at a concentration that is lower than can be directly analyzed with said instrument.

38. The method of claim 35, wherein said film provides detection of said analyte at a parts-per-billion level in said fluid or said gas.

39. The method of claim 33, wherein said film is used as a component of a sampling and analysis system or device.

40. The method of claim 33, wherein said film is used as a component of a sensor or a sensor system.

* * * * *